Figure 2:
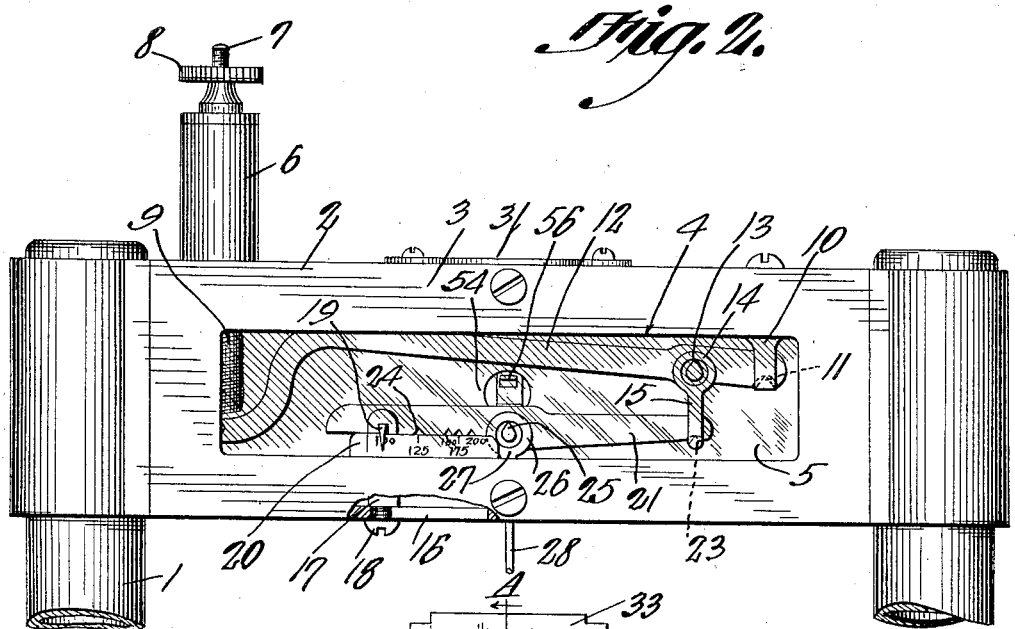

W. H. SAWYER.
BAGGING SCALE.
APPLICATION FILED JAN. 26, 1914.
1,140,485.
Patented May 25, 1915.
4 SHEETS—SHEET 1.
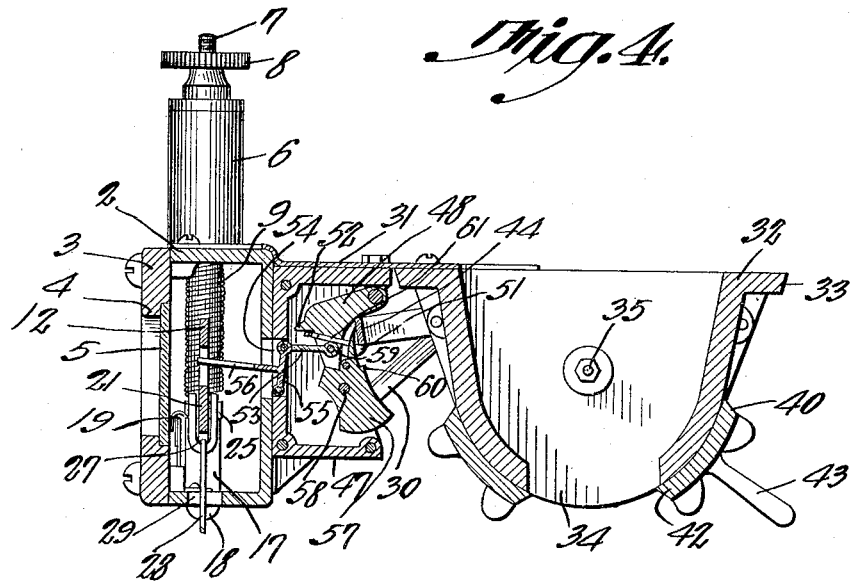
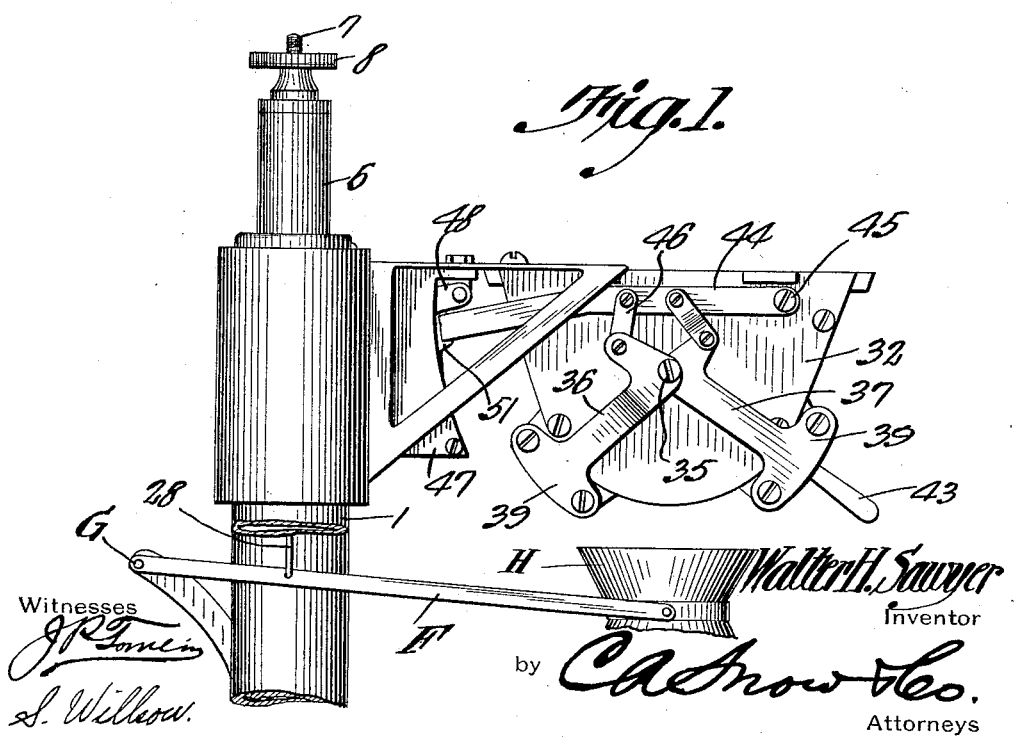

W. H. SAWYER.
BAGGING SCALE.
APPLICATION FILED JAN. 26, 1914.

1,140,485.

Patented May 25, 1915.
4 SHEETS—SHEET 2.

Witnesses

Walter H. Sawyer, Inventor
by C. A. Snow & Co.
Attorneys

W. H. SAWYER.
BAGGING SCALE.
APPLICATION FILED JAN. 26, 1914.
1,140,485.
Patented May 25, 1915.
4 SHEETS—SHEET 3.
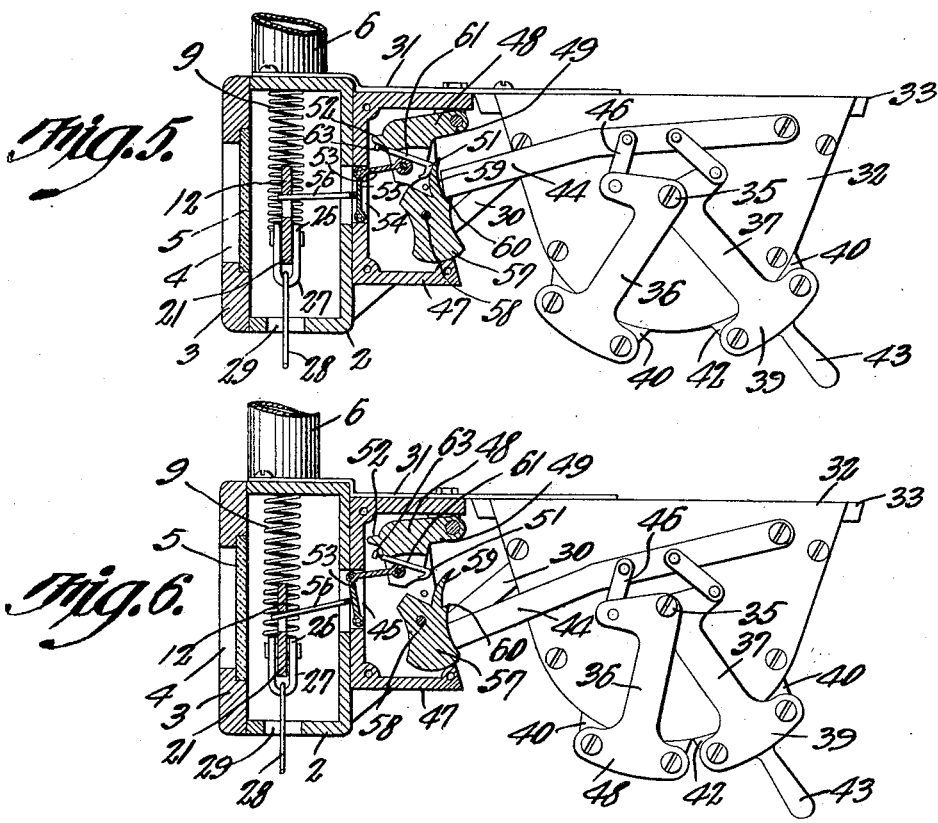
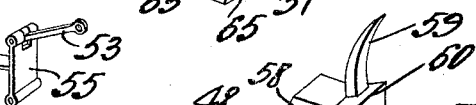
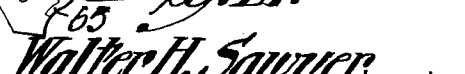
Witnesses
Walter H. Sawyer, Inventor
by C. A. Snow & Co., Attorneys W. H. SAWYER.
BAGGING SCALE.
APPLICATION FILED JAN. 26, 1914.
1,140,485.
Patented May 25, 1915.
4 SHEETS—SHEET 4.
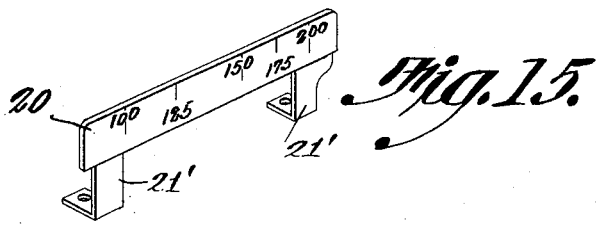
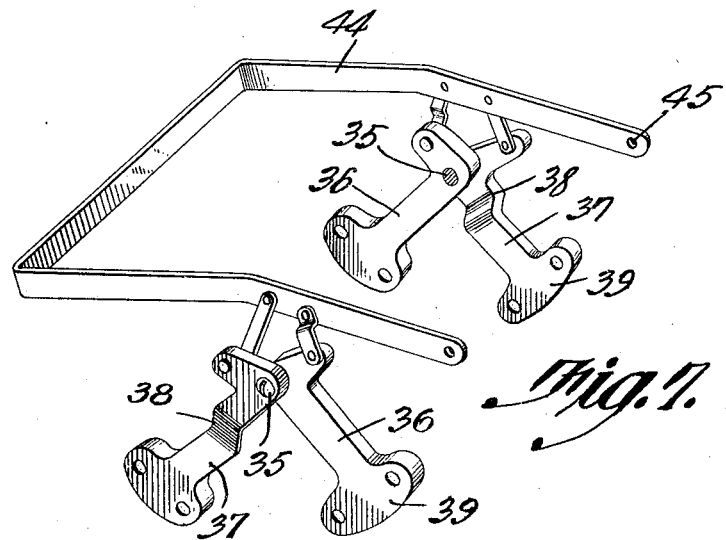
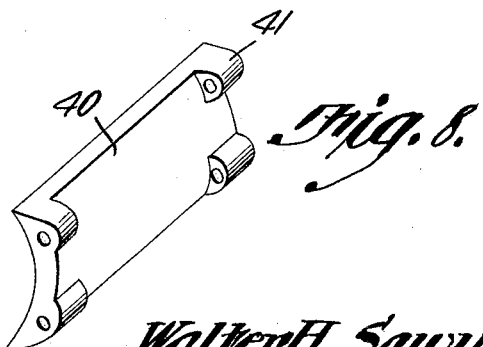
Witnesses
Walter H. Sawyer, Inventor
by C. A. Snow & Co.
Attorneys

UNITED STATES PATENT OFFICE.

WALTER H. SAWYER, OF AMERICUS, GEORGIA.

BAGGING-SCALE.

1,140,485.  Specification of Letters Patent.  Patented May 25, 1915.

Application filed January 26, 1914.  Serial No. 814,493.

*To all whom it may concern:*

Be it known that I, WALTER H. SAWYER, a citizen of the United States, residing at Americus, in the county of Sumter and State of Georgia, have invented a new and useful Bagging-Scale, of which the following is a specification.

This invention relates to machines of that type commonly known as bagging scales and which utilize means whereby, when a bag is filled with a predetermined quantity of material, the supply of material is cut off automatically.

One of the objects of the invention is to render the scales more accurate in operation by providing means whereby the flow of material through the outlet of the hopper or other receptacle provided, will be partially cut off automatically after a certain amount has been discharged, the material continuing to flow outwardly in a greatly reduced stream so that the material deposited in the sack or other receptacle, is brought slowly and gradually to the predetermined ultimate weight whereupon the supply will be completely cut off automatically.

A further object is to provide cut-offs of novel form which operate by gravity to close the outlet when they are released from their retaining means.

Another object is to provide novel means whereby the cut-offs are caused to open and close in unison without the use of gears or other toothed elements likely to become clogged with dust and thus interfere with their operation.

A further object is to provide novel means for holding the cut-offs in open and in partly open positions.

Another object is to provide means whereby the time at which the partial cut-off occurs can be regulated.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 3:
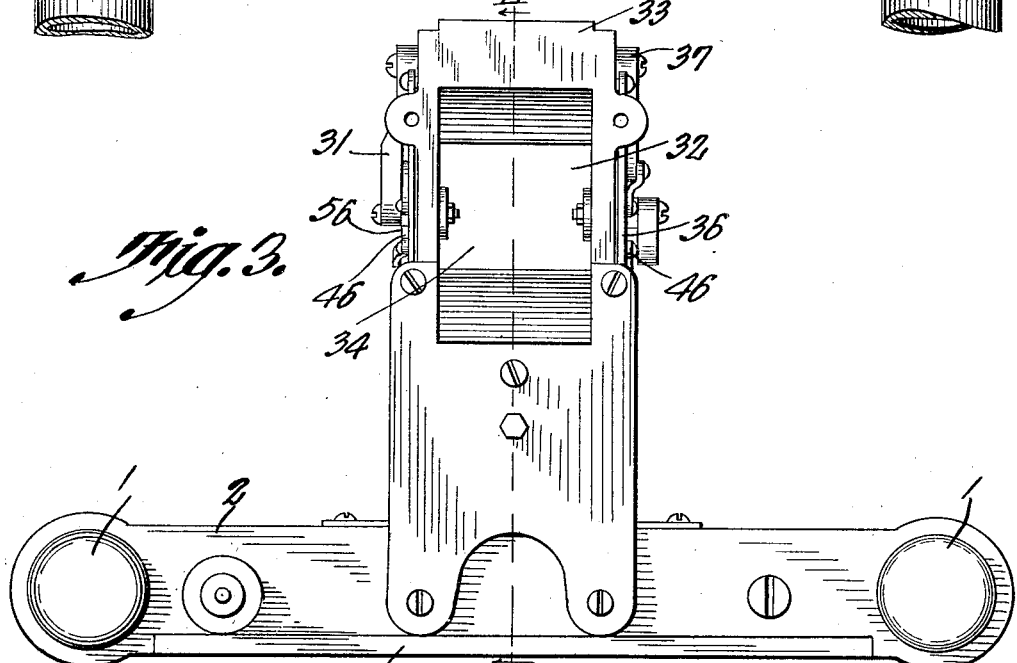

In said drawings: Figure 1 is a side elevation of the apparatus constituting the present invention. Fig. 2 is a rear elevation thereof. Fig. 3 is a plan view. Fig. 4 is a section on line A—B Fig. 3, the outlet being shown open. Fig. 5 is a view similar to Fig. 4 but showing the hopper and the cut-offs in elevation, said cut-offs being in their intermediate or partly closed positions. Fig. 6 is a view similar to Fig. 5 and showing the cut-offs in their closed position. Fig. 7 is a perspective view of the arms of the cut-offs and of the bail and its connections. Fig. 8 is a perspective view of one of the cut-offs. Fig. 9 is a perspective view of the main dog of the holding mechanism. Fig. 10 is a perspective view of the shifting lever and its link for transmitting motion to said main dog. Fig. 11 is a perspective view of the supplemental dog. Fig. 12 is a longitudinal section through the main or upper dog. Fig. 13 is a transverse section therethrough. Fig. 14 is a detail view of the slide used in the main dog. Fig. 15 is a perspective view of the graduated strip.

Referring to the figures by characters of reference 1 designates the scale supporting structure to which is secured a housing 2 constituting a connection therebetween. This housing may be provided with a removable rear face plate 3 and, as shown in Fig. 2, this face plate may be formed with a sight opening 4 closed by means of a transparent plate 5 of glass or other suitable material. Mounted on one end portion of the housing 2 is a tubular standard 6 into which projects a screw threaded stem 7 and an adjusting nut 8 is mounted on this stem 7 and bears downwardly on the upper end of the standard 6. The lower end of the stem 7 may be connected in any suitable manner to the upper end portion of a coiled spring 9 which is thus supported within one end portion of the housing 2. A bracket 10 extends downwardly within the opposed end portion of housing 2 and carries a knife edge 11 engaged by the notched end of lever 12 of the third class, the other end of the lever being engaged by the lower end portion of the spring 9. Knife edges 13 extend from opposite sides of lever 12 and engage eyes 14 formed at the ends of a supporting stirrup 15.

The bottom of the housing 2 is formed with a longitudinal slot 16 across which extends a fulcrum block 17 provided with the usual knife edge, not shown. This fulcrum block is held in any position to which it may be adjusted, by means of a clamping screw 18 which engages the bottom of the block and extends through the slot 16. Obviously by tightening the screw, its head will bind upon the bottom of the housing 2 and thus hold the block against movement. A curved index or pointer 19 extends from the fulcrum block and arches over a graduated strip 20 which is secured to the bottom of the housing, this strip being preferably formed with feet 21′ fastened to the housing in any preferred manner. The graduations on the strip can be suitably designated. This strip has been shown in detail in Fig. 15. It will be apparent that by loosening the screw 18, the fulcrum block can be shifted so as to cause the index 19 to register with any one of the graduations on the strip 20.

The main beam or lever 21 of the scales is arranged within the housing under the supplemental or tripping lever 12 and has a notched end which bears on a knife edge 23 within the stirrup 15 while the other end portion of the lever is formed with a series of notches 24, any one of which is adapted to receive the knife edge on the fulcrum block 17. These notches 24 are spaced apart distances equal to the distances between the corresponding graduations on the strip 20, as will be apparent by referring particularly to Fig. 2.

Knife edges 25 extend in opposite directions from lever 21 and engage eyes 26 formed at the ends of a stirrup 27 which, in turn, engages a bar 28. This bar 28 is adapted to be actuated by any suitable mechanism receiving motion from a bag or other receptacle supported under the outlet of a feeding element or hopper such as will be hereinafter described. For example, bar 28 can be connected to a frame F mounted to swing about a horizontal axis G and carrying a bag supporting funnel H or the like adapted to hold a bag in position to be filled. With this arrangement, as the bag is filled the increasing weight of material supplied thereto will cause the frame F to swing downwardly and pull on bar 28. This bar 28 extends loosely through an opening 29 formed in the bottom of the housing 2.

Brackets 30 are extended forwardly from the housing 2 and are connected by a top plate 31 which, in turn, is secured in any suitable manner to the upper edge portion of a hopper 32. The top of the hopper is open and is preferably flanged, as at 33, so that a suitable receptacle can be mounted on and secured to the hopper so as to discharge its contents into the hopper. The bottom of the hopper is preferably concaved and a broad outlet opening 34 extends throughout the width of the hopper at the bottom thereof. Pivot studs 35 extend from the sides of the hopper and the bottom of the hopper is concentric with these studs.

Mounted on each of the studs 35 and close to the outer face of the adjacent side of the hopper are two oppositely disposed L-shaped levers 36 and 37, the angle portion of each lever 37 being offset, as shown at 38, so that the angle portions of the two levers can lap where they engage the studs 35. The long arm of each lever has an enlargement 39 and interposed between the enlargements of the corresponding levers is a curved cut-off plate 40 having ears 41 adapted to receive bolts or the like whereby the enlargements 39 may be secured to the ends of the cut-off plates. The cut-off plates are so shaped as to slide along the curved bottom of the hopper and, when the plates are in their lowermost positions, they contact so as thus to close the outlet opening 34. Those edges of the plates 40 adapted to contact are preferably beveled, as shown at 42, so as positively to cut off the material and prevent it from being caught between the plates 40 and thus interfering with the closing together of the plates. One of the cut-off plates is provided with a handle 43 as shown.

A bail 44 straddles the hopper 32 and is pivotally connected thereto at its ends, as shown at 45. Spaced links 46 connect each side of the bail 44 to the adjacent short arms of the levers 36 and 37. These links are so arranged and proportioned that when the handle 43 and its cut-off plate 42 are swung upwardly, the links 46 operated thereby will push upwardly against the bail 44 and cause said bail to pull through the other links 46 upon the short arms of the members 36. Thus the two cut-off plates will be moved apart and the outlet opening 34 will be exposed. Interposed between the brackets 30 and directly under the top plate 31 is a casing 47 the front face of which is open and is curved so as to lie close to and concentric with the path of the intermediate portion of bail 44. Mounted within the upper portion of this casing 47 is the upper or main dog 48 of the holding mechanism. This dog, which has been illustrated in detail in Fig. 9, has its pivot engaging portion extended forwardly from the upper end thereof as shown at 49 and the bulk of the weight of the dog is thus located back of the pivot. The downwardly extending portion of the dog is forked, as shown at 50 and has forwardly projecting shoulders 51. Additional weight may be added to the back portion of the dog by extending a lip 52 therefrom. A link 53 projects into the forked lower portion of the dog 48 and is pivotally connected thereto, this link extending rearwardly into an opening 54 formed in the back of the casing 47 and in the front of the housing 2. Fulcrumed within this opening 54 is a lever 55 to the upper end of which the link 53 is connected. A finger 56 is fixedly connected to and extends rearwardly from the lever 55 and projects under and normally out of contact with the secondary or tripping lever 12. As the dog 48 tends to swing downwardly and forwardly, it will be apparent that the weight thereof will hold the finger 56 normally elevated but spaced from lever 12. This arrangement of the parts is illustrated in Fig. 4.

Mounted within the lower portion of the casing 47 is the lower or supplemental dog 57 which has been shown in detail in Fig. 11. This supplemental dog is fulcrumed back of the center of its upper end, as shown at 58 so that the greater portion of the weight of the dog is located below and in front of the pivot thereof when said dog is in its set position as shown in Fig. 4. An upwardly and forwardly curved tongue 59 extends from the top of the dog 57 and is adapted, when the dogs are set, to extend into the forked portion of the main or upper dog 48 so as to lie back of the shoulders 51. A shoulder 60 is formed along the upper face of dog 57 and the rear portion of the upper face of the dog is inclined and adapted to be engaged by the lower end of the dog 48 so as to thus hold the lower dog against rotation about its pivot.

In order that the movement of dog 48 necessary to release the bail 44 can be varied at will, it is preferred to so mount the shoulders 51 that they can be adjusted relative to the dog. For this purpose the said shoulders 51 are preferably formed at the ends of a substantially U-shaped slide 61 the side portions of which are mounted within grooves 62 formed in the inner sides of the forked portion of the dog. The back portion of the slide 61 is engaged by an adjusting screw 63 which is preferably swiveled within the dog, as shown at 64 and is adapted, when rotated, to shift the slide 61 relative to the dog 48 and thus project the shoulders 51 outwardly or draw them inwardly as desired. The said shoulders may be provided with deflecting tongues 65 at their lower ends and which are curved downwardly and rearwardly as shown. With this arrangement it will be apparent that by adjusting the shoulders 51 forwardly, the time during which the bail 44 will be engaged thereby during the rearward swinging of dog 48 will be prolonged whereas, by drawing the shoulders 51 rearwardly relative to dog 48, this period of engagement with the bail will be shortened. Both of the shoulders 60 and 51 are located directly in the path of the intermediate portion of bail 44 so that, when the bail is moving upwardly along the front face of the casing 47, it will successively strike the shoulders 60 and 51 so as to push the dogs rearwardly successively until said intermediate portion of the bail assumes a position above the upper shoulders 51 whereupon dog 48 will gravitate back so as to bring said shoulders 51 directly under the intermediate portion of the bail.

The operation of the apparatus is as follows: Let it be assumed that a bag or the like to be filled is located under the hopper 32 upon structure F which, when depressed by the weight of the bag or other receptacle and its contents will pull downwardly on the bar 28. Let it be assumed furthermore that a receptacle containing the material to be bagged is mounted above and discharging into the hopper 32. When the cut-offs 42 are in their closed positions, the material will be prevented from discharging through the outlet 34. Should it be desired to deposit one hundred pounds of material within the sack, the fulcrum block 17 is adjusted, in the manner hereinbefore described, until the index 19 registers with the graduation on strip 20 which indicates one hundred pounds. When the block is thus positioned it will project into the corresponding notch 24 in the main lever 21. After the scales have thus been adjusted, the operator pulls upwardly on handle 43. The two cut-off plates 40 will thus move upwardly away from the opening 34 to the positions shown in Fig. 4 and during this movement of the cut-off plates 40, the bail 44 will be swung upwardly and will first pass the shoulder 60, then strike the tongue 59 and push it rearwardly into the forked portion of dog 48, and then pass over the upper shoulder 51. As soon as the bail passes this upper shoulder, dog 48 will gravitate forwardly so as to position the shoulder under the intermediate portion of the bail 44, whereupon the bail will be held as illustrated in Fig. 4. As soon as the cut-off plates 40 are moved apart as shown in Fig. 4, the material in the hopper 32 will gravitate through the opening 34 and into the bag or other receptacle thereunder. As the weight of the bag and its contents gradually increases, lever 21 will be pulled downwardly slowly by the bar 28, thus pulling on stirrup 15 and causing the tripping or supplemental lever 12 to swing downwardly upon its fulcrum 11 and against the action of spring 9. This lever 12 will ultimately move against the finger 56 and swing it downwardly slowly, and as this finger is integral with lever 55, said lever will be swung upon its fulcrum and will pull, through link 53, upon dog 48. Thus the dog will be gradually withdrawn from engagement with the upper end of the dog 57 and when dog 48 has moved a predetermined distance, the shoulders 51 will be withdrawn from under the bail 44. Said bail will promptly gravitate along the front face of the tongue 59 until it comes against the lower shoulder 60. During this gravitation of the bail, the cut-off plates 40 will swing toward each other so as to partly close the outlet opening 34 and thus reduce the stream of material discharging through the opening. This smaller stream of material will continue to discharge until the bag or other receptacle has received its predetermined quantity whereupon the downwardly moving supplemental or tripping lever 12 will bring the finger 56 to such a point as to completely withdraw the lower end of dog 48 from above dog 57. Thereupon the dog 57 will be released and shoulder 60 will move downwardly and rearwardly, thus releasing bail 44 and permitting the cut-off plates 40 to move together and thus cut off the flow of material. The intermediate position assumed by the dogs and the bail has been illustrated in Fig. 5 and the ultimate position of the parts has been illustrated in Fig. 6. As soon as the bar 28 is relieved of the weight of the filled sack or other receptacle, the spring 9 will return the levers 12 and 21 to their initial positions and dog 48 will swing downwardly and forwardly, thus elevating finger 56 to its normal position. Obviously, therefore, the holding mechanism will thus be reset whereupon the operation hereinbefore described can be repeated.

By providing shoulders 51 which are adjustable relative to the dog 48, the interval during which a reduced flow of material is discharged from the hopper, can be lengthened or shortened. For example if the parts are set so that the bail 44 will be released from shoulders 51 when the bag being filled has received seventy-five pounds of material and the said bail will be released from shoulder 60 when the bag has received one hundred pounds of material, the last twenty-five pounds of the material will be discharged in a reduced stream. If, however, it should be desired to so adjust the parts that the last fifteen pounds only would be discharged in a reduced stream, it would be necessary to adjust the slide 61 forwardly so that the shoulders 51 would present increased areas to the bail 44. Thus a greater rearward movement of dog 48 would be necessary in order to release bail 44 and the time of release would thus be nearer the time when the bail would be released from the shoulder 60.

Importance is attached to the particular means provided whereby the bail 44 is elevated and the two cut-off plates are operated in unison. By providing link connections between the arms of the cut-offs and the bail, this movement of the cut-off plates in unison is effected without the necessity of utilizing toothed segments or the like such as have heretofore been employed and which are objectionable because they soon become clogged with dust, etc.

What is claimed is:—

1. In bagging scales, a feeding element having an outlet, opposed cut-offs, a pivoted member, a connection between said member and each cut-off, means for engaging said member to hold the cut-offs in open position, and means under the control of a receptacle being filled for releasing said holding means, thereby to release the member and cut-offs.

2. In bagging scales, a feeding element having an outlet, a cut-off, a member movable with the cut-off, means for engaging said member to hold the cut-off in open position, and means under the control of a receptacle being filled for actuating said holding means to release the member and cut-off.

3. In bagging scales, a feeding element having an outlet opening, a cut-off, a member movable with the cut-off, a pivoted element, means adjustably mounted on said element for engaging said member to hold the cut-off in open position, and means under the control of a receptacle being filled for actuating said pivoted element to release the member and the cut-off.

4. In bagging scales, a feeding element having an outlet, a cut-off, a member movable with the cut-off, a pivoted element, a shoulder therein for engaging said member to hold the cut-off in open position, means under the control of a receptacle being filled for actuating said pivoted element to withdraw the shoulder from engagement with the member, and means for adjusting said shoulder to vary its period of engagement with the member during the actuation of the pivoted element.

5. In bagging scales, a feeding element having an outlet, a cut-off, a member movable therewith, a pivoted element for engaging said member to hold the cut-off in open position, means under the control of a receptacle being filled for actuating said element to release the member, a pivoted element for engagement by the released member to hold the cut-off in partly closed position, the first named pivoted element constituting means for holding the last named pivoted element against movement, and said last named element being movable to release the said cut-off member when the first named pivoted element is shifted a predetermined distance.

6. In bagging scales, a feeding element having an outlet, a cut-off, a member movable with the cut-off, an upper pivoted element for engaging said member to hold the cut-off in open position, a lower pivoted element held against movement by said upper element, and means under the control of a receptacle being filled, for actuating the upper element to successively release said member and the lower pivoted element, the released member being movable against and adapted to be supported by the lower pivoted element until said last named element is released.

7. In bagging scales, a feeding element having an outlet, a pivoted holding element, means under the control of a receptacle being filled for actuating said element, arms mounted to swing at the sides of the feeding element, a cut-off carried by the arms, a member mounted to swing upon the feeding element and to be engaged by the holding element, and link connections between said member and the arms whereby, when the cut-off is moved to open position, the member is elevated into engagement with the pivoted element.

8. In bagging scales, a feeding element having an outlet, angular arms mounted to swing at the sides of said element, a cut-off carried thereby, a bail pivotally connected to the feeding element, link connections between said bail and the arms, a pivoted element adapted to be engaged by said member to hold the cut-off in open position, and means under the control of a receptacle being filled, for actuating said pivoted element to release the member.

9. In bagging scales, a feeding element having an outlet, oppositely disposed arms at each side of said feeding element and pivotally mounted at their angle portions, cut-offs interposed between and connected to the corresponding arms at the sides of the feeding element, a bail pivotally connected to the sides of the feeding element, link connections between the bail and the upper ends of the arms, said arms and links coöperating, when one of the cut-offs is moved to open position, to elevate the bail and move the other cut-off to open position.

10. In bagging scales, a feeding element having an outlet, oppositely disposed arms at each side of said feeding element and pivotally mounted at their angle portions, cut-offs interposed between and connected to the corresponding arms at the sides of the feeding element, a bail pivotally connected to the sides of the feeding element, link connections between the bail and the upper ends of the arms, said arms and links coöperating, when one of the cut-offs is moved to open position, to elevate the bail and move the other cut-off to open position, a pivoted element for engaging the bail to hold the cut-offs in open position, and means under the control of a receptacle being filled for actuating said pivoted element to release the bail.

11. In bagging scales, a feeding element having an outlet, oppositely disposed arms at each side of said feeding element and pivotally mounted at their angle portions, cut-offs interposed between and connected to the corresponding arms at the sides of the feeding element, a bail pivotally connected to the sides of the feeding element, link connections between the bail and the upper ends of the arms, said arms and links coöperating, when one of the cut-offs is moved to open position, to elevate the bail and move the other cut-off to open position, a pivoted upper element for engaging the bail to hold the cut-offs in open position, a lower pivoted element normally held against movement by the upper element, and means under the control of a receptacle being filled for actuating the upper pivoted element to release the bail and deposit it upon the lower pivoted element and subsequently release the lower pivoted element, said lower element when released, operating to release the bail.

12. In bagging scales, a feeding element having an outlet, a cut-off, a member movable with the cut-off, an upper pivoted element for engaging the member to hold the cut-off in open position, a lower pivoted element normally held against movement by the upper pivoted element, a lever, a link connection between the lever and the upper pivoted element, a finger integral with the lever, a yieldingly supporting tripping lever overhanging the finger, and means for transmitting motion from a receptacle being filled to said tripping lever to actuate the finger and successively disengage the upper pivoted element from the cut-off member and from the lower pivoted element, said member, when released, being deposited in engagement with and supported by the lower pivoted element, and said lower element, when released, being adapted to release the member to completely close the cut-off.

In testimony that I claim the foregoing as my own, I have hereto affixed my signature in the presence of two witnesses.

WALTER H. SAWYER.

Witnesses:
A. THAD. GLOVER,
H. S. COUNCIL.

Copies of this patent may be obtained for five cents each, by addressing the "Commissioner of Patents, Washington, D. C."